United States Patent
Petrovichev et al.

(10) Patent No.: US 10,284,543 B2
(45) Date of Patent: May 7, 2019

(54) SYSTEM AND METHOD FOR SECURE ONLINE AUTHENTICATION

(71) Applicant: AO Kaspersky Lab, Moscow (RU)

(72) Inventors: Dmitry L. Petrovichev, Moscow (RU); Artem O. Baranov, Moscow (RU); Evgeny V. Goncharov, Moscow (RU)

(73) Assignee: AO KASPERSKY LAB, Moscow (RU)

( * ) Notice: Subject to any disclaimer, the term of this patent is extended or adjusted under 35 U.S.C. 154(b) by 133 days.

(21) Appl. No.: 15/237,738

(22) Filed: Aug. 16, 2016

(65) Prior Publication Data
US 2017/0374057 A1 Dec. 28, 2017

(30) Foreign Application Priority Data

Jun. 24, 2016 (RU) .................. 2016125283

(51) Int. Cl.
*H04L 29/06* (2006.01)

(52) U.S. Cl.
CPC ...... *H04L 63/0823* (2013.01); *H04L 63/0869* (2013.01); *H04L 63/101* (2013.01); *H04L 63/126* (2013.01)

(58) Field of Classification Search
CPC ..... H04L 63/0823; H04L 63/04; H04L 63/12; H04L 63/14; H04L 63/10; H04L 63/06;
(Continued)

(56) References Cited

U.S. PATENT DOCUMENTS 8,533,834 B1 * 9/2013 Wong ............... H04L 63/14
709/217
9,117,075 B1 * 8/2015 Yeh .................. G06F 21/56
(Continued)

FOREIGN PATENT DOCUMENTS

JP 2004-151863 A 5/2004
JP 2004-355511 A 12/2004
(Continued)

OTHER PUBLICATIONS

Extended European Search Report for EP 16 19 5888 dated Feb. 6, 2017.

*Primary Examiner* — Carl G Colin
*Assistant Examiner* — Han Yang
(74) *Attorney, Agent, or Firm* — Arent Fox LLP; Michael Fainberg (57) ABSTRACT

Disclosed are systems and methods for secure online authentication. An exemplary method comprises: determining, via a processor of a computing device, a connection being established between a browser application installed on a computer system and a protected website; obtaining information relating to the protected website in response to obtaining a request for authentication from the protected website; establishing a protected data transmission channel with the protected website to receive at least one certificate of the protected website; performing authentication and transmitting authentication data to the protected website; and in response to an indication of a successful authentication from the protected website, transmitting identification information to the browser application for enabling access to the protected website.

20 Claims, 5 Drawing Sheets

(58) Field of Classification Search
CPC ......... H04L 63/20; H04L 63/08; H04L 63/00; H04L 63/101; H04L 63/0869; H04L 63/126
See application file for complete search history.

(56) References Cited

U.S. PATENT DOCUMENTS

| | | | |
|---|---|---|---|
| 9,282,094 B1* | 3/2016 | Hunold | G06F 21/554 |
| 9,344,447 B2* | 5/2016 | Cohen | G06Q 40/12 |
| 9,520,918 B2* | 12/2016 | Adrangi | H04B 5/00 |
| 2009/0037997 A1* | 2/2009 | Agbabian | H04L 63/1416 726/10 |
| 2011/0321139 A1* | 12/2011 | Jayaraman | G06F 21/51 726/4 |
| 2014/0173709 A1* | 6/2014 | Eldar | H04L 9/3226 726/7 |
| 2015/0281227 A1* | 10/2015 | Fox Ivey | H04L 63/0853 713/168 |
| 2016/0087974 A1* | 3/2016 | Wharton | H04L 63/0823 726/10 |
| 2017/0366582 A1* | 12/2017 | Kothekar | H04L 63/205 |

FOREIGN PATENT DOCUMENTS

| | | |
|---|---|---|
| JP | 2007-334753 A | 12/2007 |
| JP | 2008-521149 A | 6/2008 |
| WO | 2013/089771 A1 | 6/2013 |
| WO | 2013/089777 A1 | 6/2013 |

* cited by examiner

SYSTEM AND METHOD FOR SECURE ONLINE AUTHENTICATION

CROSS-REFERENCE TO RELATED APPLICATIONS

This application claims benefit of priority under 35 U.S.C. 119(a)-(d) to a Russian Application No. 2016125283 filed on Jun. 24, 2016, which is incorporated by reference herein.

FIELD OF TECHNOLOGY

The disclosure relates generally to the field of data security, and more specifically, to systems and methods of secure online authentication.

BACKGROUND

At present there is a large volume of software for performing various online transactions. Many online transactions involve banking services and electronic money transfers. These transactions are typically performed via standard Internet browsers and separate banking clients (applications), which are especially popular on mobile platforms. Among other applications related to online transactions, electronic currency systems may serve as an example, such as WebMoney or PayPal, or online games which use their own system of micro-transactions during which the user purchases in-game objects or in-game currency with real funds (by using their credit card, for example).

With the growth of online payments, hackers have become very interested in this service sector and actively trying possible ways of intercepting the data of transactions for the purpose of unlawful (fraudulent) transfer of funds. In one example, the theft of such data may be done using malicious programs (or using phishing), which get onto the computers of the users (infecting them). Most often such programs may get onto the computers by infecting popular Internet browsers, intercept data being entered from data entry devices (such as a keyboard or mouse), or intercept data being sent on the network. For example, malicious programs infecting browsers gain access to the browser files and search through the browsing history and the passwords saved when visiting web pages. Data entry interceptors (keyloggers), for example, may intercept the entry of data from a keyboard or mouse, take photographs of the screen (screenshots) and hide their presence in the system using various rootkit technologies. Similar technologies may also be used to create interceptors of network packets (traffic sniffers), which intercept network packets as they are transmitted and extract valuable information from them, such as passwords and other personal data. It should be noted that an infection occurs most often due to vulnerabilities in the software, which makes it possible to carry out various exploits to penetrate the computer system and then install malicious software.

Existing antivirus technologies, such as the use of signature or heuristic analysis, methods of proactive protection or the use of lists of trusted applications (whitelists), may be able to detect some malicious programs on the computers of users, but may not always be able to determine their new modifications, the frequency of appearance of which may be growing on a daily basis. Thus, it is desirable to have robust solutions for safeguarding the programs that facilitate online payments by users.

Some existing software and hardware solutions introduce supplemental factors of authentication, such as the sending of a one-time password (OTP) to a mobile telephone of a user or via the use of hardware for user authentication. However, these solutions may also be vulnerable. One of the examples of harmful programs which can intercept OTPs may include the malicious program Zeus. Thus, improved solutions are needed in order to protect the user's data from being intercepted during an online transaction.

SUMMARY

Disclosed are systems and methods for secure online authentication. In one exemplary aspect, a computer-implemented method for secure online authentication comprises: determining, via a processor of a computing device, a connection being established between a browser application installed on a computer system and a protected website; obtaining information relating to the protected website in response to obtaining a request for authentication from the protected website; establishing a protected data transmission channel with the protected website to receive at least one certificate of the protected website; performing authentication and transmitting authentication data to the protected website; and in response to an indication of a successful authentication from the protected website, transmitting identification information to the browser application for enabling access to the protected website.

In another exemplary aspect, determining the connection being established between the browser application installed on the computer system and the protected website comprises: obtaining a uniform resource identifier (URI) address of the protected website via an application programming interface (API) provided by the browser application; or intercepting network traffic between the browser application and the protected website via a driver to obtain a uniform resource identifier (URI) address of the protected website.

In yet another exemplary aspect, the method further comprises: confirming the protected website against a list of addresses of protected websites accessed by the computer system; storing, on the computing device, the list of addresses of protected websites accessed by the computer system and encrypted data relating to the protected websites.

In another exemplary aspect, the information relating to the protected website comprise: a URL address, information relating to the at least one certificate of the protected website, WHOIS information about a domain of the protected website, a list of headers obtained from a reply to a request at the URL address, information relating to downloaded scripts in the form of convolutions or hash sums.

In yet another exemplary aspect, establishing the protected data transmission channel with the protected website comprises: establishing the protected data transmission channel via a driver installed on the computer system; obtaining a complete tree of certificates for the protected website from the driver to check a validity of the at least one certificate; and using a list of root certificates of the computing device to determine a validity of the complete tree of certificates for the protected website.

In another exemplary aspect, the method further comprises checking a validity of the protected website based on obtained information relating to the protected website, the information comprising obtained headers or list of downloaded scripts when establishing the connection; and obtaining a second authentication factor for performing the authentication and transmitting the authentication data to the protected website.

In another exemplary aspect, the method further comprises continuing access to the protected website using browser application after transmitting identification information to the browser application for enabling access to the protected website.

In another exemplary aspect, a system of secure online authentication comprises at least one processor of a computing device configured to: determine a connection being established between a browser application installed on a computer system and a protected website; obtain information relating to the protected website in response to obtaining a request for authentication from the protected website; establish a protected data transmission channel with the protected website to receive at least one certificate of the protected website; perform authentication and transmit authentication data to the protected website; and in response to an indication of a successful authentication from the protected website, transmit identification information to the browser application for enabling access to the protected website.

In yet another exemplary aspect, a non-transitory computer readable medium storing thereon computer executable instructions for secure online authentication, including instructions for: determining a connection being established between a browser application installed on a computer system and a protected website; obtaining information relating to the protected website in response to obtaining a request for authentication from the protected website; establish a protected data transmission channel with the protected website to receive at least one certificate of the protected website; performing authentication and transmit authentication data to the protected website; and in response to an indication of a successful authentication from the protected website, transmitting identification information to the browser application for enabling access to the protected website.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method and computer program product of secure online authentication. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
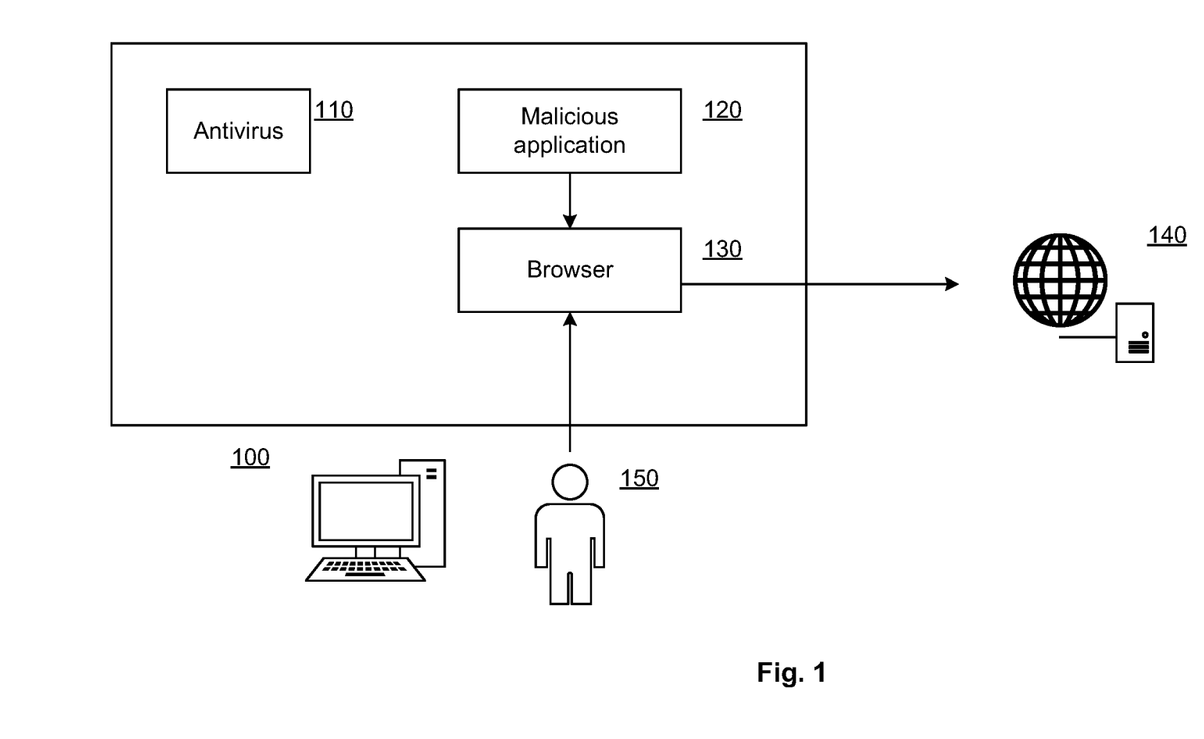
FIG. 1 shows a process of user access to a website in conditions of an untrusted environment.

FIG. 1 shows a process of user access to a website in conditions of an untrusted environment. An untrusted environment may include a computer system 100 on which, even if an antivirus application 110 is installed, there may still exist a risk of the presence of a malicious application 120, which may compromise the working of a user 150 with a protected site 140 (i.e., with a site where it is necessary to protect the data being received and transmitted when interacting with it) through a browser 130. The antivirus application 110 may be designed to scan an operating system installed on the computer system 100 for the presence of vulnerabilities and malicious applications. The result of the antivirus scan may indicate the following status: how many and which malicious programs and vulnerabilities have been found. As has been noted above, antivirus technologies that search for and detect malicious applications may not guarantee the detection and removal of all malicious applications because the creators of the latter may be constantly working on ways of circumvent the antivirus scans. For example, methods are known for obfuscation of a code being executed to make signature and heuristic analysis more difficult, as well as methods of anti-emulation, which may make it possible to avoid detection of a malicious application during its emulation by means of an antivirus application. Thus, a solution is needed for protecting the data being received and transmitted from the site 140.

Figure 2:
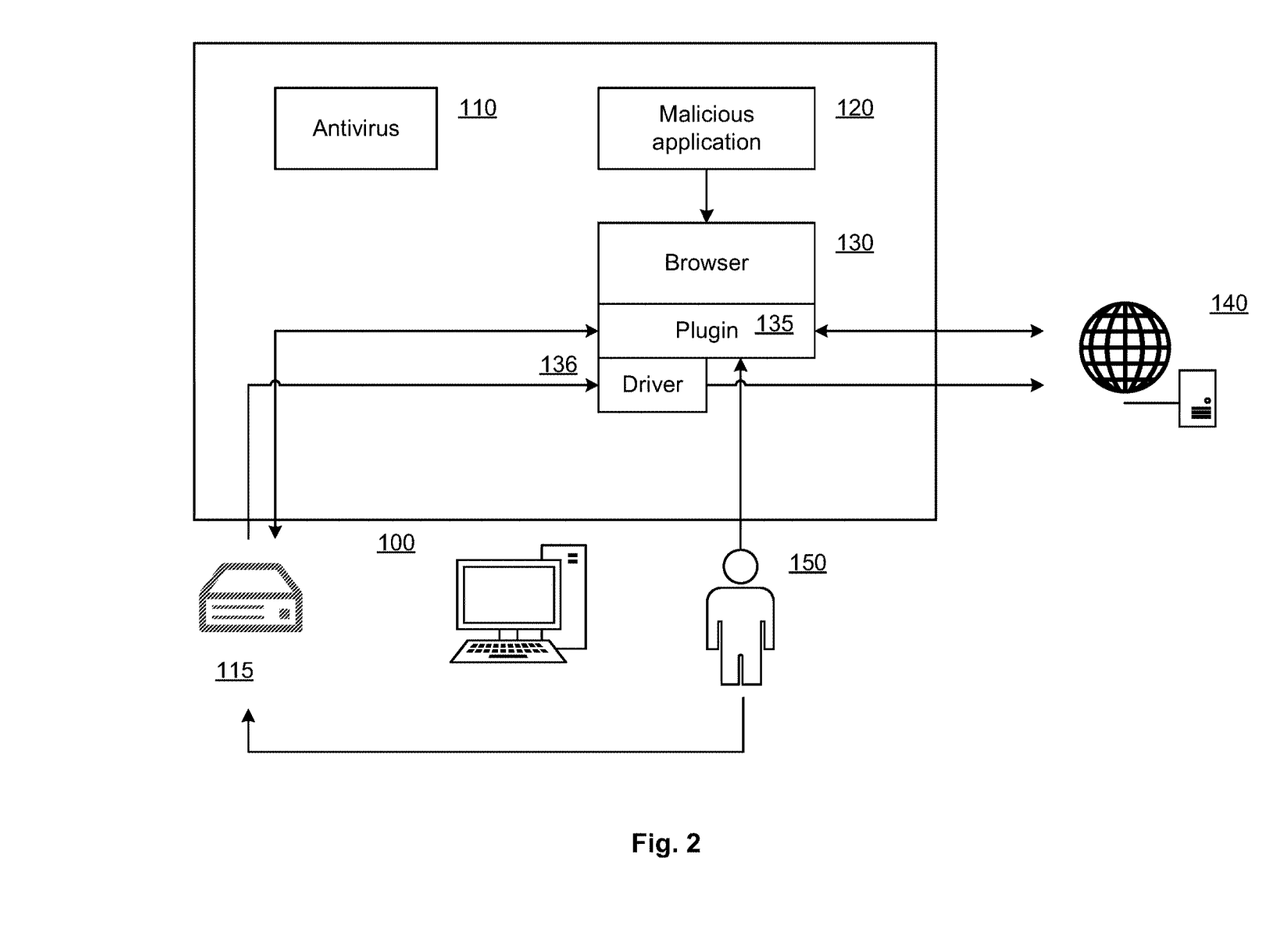
FIG. 2 shows an exemplary system for secure online authentication in conditions of an untrusted environment.

FIG. 2 shown exemplary system for secure online authentication in conditions of an untrusted environment. In comparison to FIG. 1, a device for secure data transmission 115 and a plugin in a browser 135 may be added. More specifically, the plugin 135 may be designed to determine that a user 150 has established a connection to the protected site 140 via a browser 130, and to transmit information that a connection has occurred with the protected site 140 to the device for secure data transmission 115. In some aspect, the plugin 135 may be provided as part of an antivirus 110.

The establishment of a connection may be determined by the plugin 135 via an application programming interface (API), which is provided by the browser 130, and in which the uniform resource identifier (URI) address of the site 140 may be determined by an analysis of the GET or POST request.

Alternatively, the plugin 135 may call for installing a separate driver 136 (it may be part of the plugin 135, or be a separate application) for intercepting network traffic between the browser 130 and the site 140. Based at least on the intercepted data, a Uniform Resource Locator (URL) address of the site 140 may be determined. Such a driver may also be used to establish a separate connection between the device 115 and the site 140. This driver may also obtain information about the site 140—such as the certificate of the site 140.

A list of protected addresses may be stored on the device for secure data transmission 115 along with encrypted data needed for the authentication. Upon activation (connection to the computer 100) of the device 115, the list of protected addresses may be downloaded to the memory of the plugin 135, which may scan each address being visited by the user for its presence on this list. The plugin 135 may save the list of addresses either in its own memory or on the hard disk of the computer system 100.

Thus, the list of addresses of the protected sites may be saved either in the plugin 135 or in the device for secure data transmission 115. Generally, such a list may be created either by the user 150 himself or by developers of the device for secure data transmission 115 or the plugin 135 (generally the developer of one or both of them). According to aspects of the invention, there may be a number of ways of ensuring secure access of the user to sites. One example of the technologies ensuring secure access to sites may include the "Secure payments" technology developed by Kaspersky Laboratory.

In response to obtaining a request for authentication from the protected site 140, the plugin 135 may send this address and the request itself, including information about the site (such as the form of authentication), to the device 115. The plugin 135 may also send supplemental information for the scan on the device 115, such as: URL address, information on the certificate(s) of the site, WHOIS information about the domain, a list of headers obtained from the reply to a request at the URL address, information on downloaded scripts in the form of convolutions (hash sums).

In one exemplary aspect, the device 115 may include an actual software and/or hardware device, system, component, group of components realized by the use of hardware, such as integrated microcircuits (application-specific integrated circuit, ASIC) or a programmable gate array (field-programmable gate array, FPGA) or, for example, in the form of a combination of software and hardware, such as a microprocessor system and a set of program instructions, or also based on neurosynaptic chips.

In one exemplary aspect, the device for secure data transmission 115 may include a processor, a memory module for the storing and use of temporary data, a data medium with capability of creating and encrypting partitions, and also at a minimum one adapter (generally a USB) for connecting to the computer system 100, as well as means for entering/obtaining user authentication factors. As discussed above, the device 115 may save a list of addresses of protected sites together with encrypted data relating to these sites (generally this may include login/password associations and other data of authentication forms, but it may also include other confidential user data, such as payment data). This list may be downloaded from the device 115 into the memory of the plugin for comparison with each subsequent request.

Immediately after receiving a request for authentication sent by the plugin 135, the device 115 may initiate a creation of a new protected connection to the site 140, from which it may obtain a certificate. The new protected connection may be created by a driver 136. For the checking (verification) of the certificate received, the device 115 may inquiry the driver 136 installed on the computer 100 for a complete tree of certificates for the site 140 with the exception of the root certificate. Using its own list of root certificates, the device 115 may check the validity (trustworthiness) of the entire chain of certificates for the site 140. If the check is not successful, the protected connection may be disconnected. The device 115 may also use other information from the plugin 135 for the checking of the site 140—for example, the obtained headers or list of downloaded scripts when establishing the connection. For example, the device 115 may compare the convolution (hash sum) of the downloaded scripts from the site 140, obtained from the plugin 135, with its own hash sum, which may be saved on the device 115, and if the convolutions do not match, the connection to the site 140 may be disconnected.

In one exemplary aspect, information (such as personal data of the user) may be stored on a data medium in the device 115, and executable code may be implemented upon receiving data from the plugin 135. In one aspect, the working with the device 115 may only be done using the plugin 135. For example, the PKI (Public Key Infrastructure) architecture may be used for the authentication and exchange of data. The private key for the device 115 may be provided by the developer of the given device.

In another exemplary aspect, the plugin 135 may call for access to data which may be stored in the memory of the plugin 135 through the use of a separate API, which may allow the developers of foreign devices similar to the device 115 to use the given plugin.

Another functionality of the device 115 may include implementation of a second user authentication factor. The use of a second authentication factor may be realized using an OTP, confirmation of the digital signature of the user, or biometric data of the user. This makes it possible to protect the user's authentication data from a memory dump of the device 115 when stolen. Only after receiving the second authentication factor is the device 115 able to decrypt the user's authentication data and send it to the site 140 as if this data had been filled out and sent with the use of the browser 130.

The device 115 may perform the authentication and send the necessary authentication data relating to the site 140. Besides the authentication data, the device 115 may also store other information—such as payment data on the user's accounts/transactions. Such information may be stored in encrypted form and may be decrypted only after obtaining information on the performance of the second authentication factor. In response to obtaining the response on successful authentication from the site 140, the device 115 may send an identifier of a new session and other information needed for the identification of the authorized user to the plugin 135, which may dispatch them to the browser 130 in response to the browser dispatching the original request to the site 140. Thus, the browser 130 at once may obtain the data of the new session of the user, thereby continuing the usual web surfing, but now as an authorized user to the site.

In another exemplary aspect, the user's information may be stored on the device 115 via the sale of the device 115 with user data already incorporated by the bank which also owns the site 140. Alternatively, the plugin 135 may record the user's information on the site 140 (e.g., it may play the role of a password manager) and transmit this to the device 115.

In another exemplary aspect, the authentication data of the user 150 may be transmitted to the site 140. The information from the device 115 may be sent in response to the site 140 in at least one of the following ways:

Inserting the data on a web page of the site 140. Certain data (such as login and password) may be associated with the URL address of the web page and inserted in definite fields (as a rule, the fields for inserting the login and the password have a number of attributes by which they may be computed, such as the attribute "password" of the tag "input").

The data may be prepared in advance in the form of a GET/POST request and dispatched to the server at a particular moment of time or upon occurrence of a certain event. The simplest example may include the dispatching of a POST request with login and password data inserted in the form after receiving a response from the site to a GET request for a web page where said login and password need to be inserted.

Figure 3:
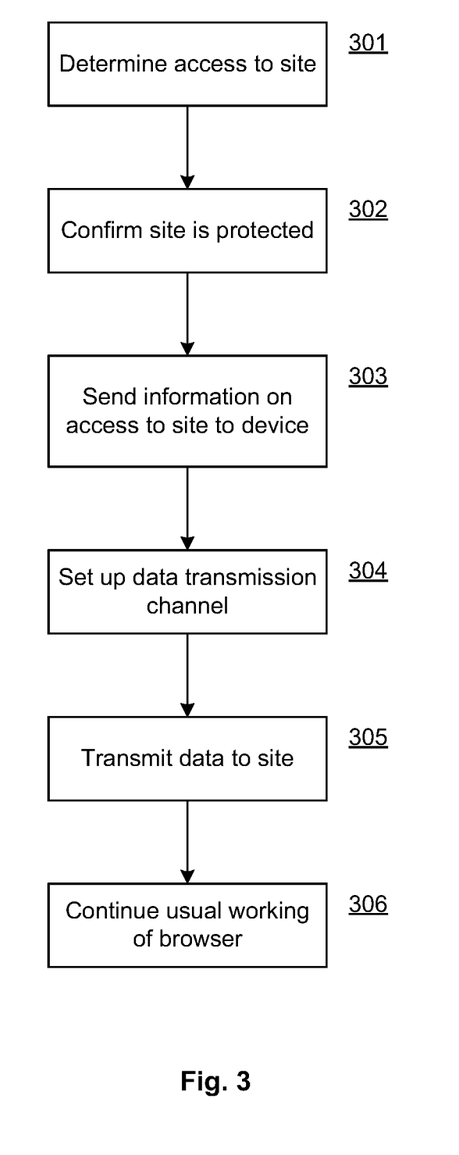
FIG. 3 shows an exemplary method of secure online authentication.

FIG. 3 shows an exemplary method of secure online authentication according to aspects of the present invention. In step 301, it may be determined the user accessed the site (the user has made a connection) using the browser 130, after which in step 302 it may determined that the site is a protected site 140. More details on the determination of the address of the site 140 have been given in the description of FIG. 2 in the context of the description of the working of the plugin 135. In step 303, the device 115 may receive information from the plugin 135 as to the fact of the user accessing the site 140 (i.e., the user may have made a connection), after which the device 115 may set up and use a protected data transmission channel in step 304. In one aspect, the protected data channel may include an https connection. In step 305, the device 115 may extract all information relating to the site 140 and transmit it via the protected data transmission channel. In step 306, the user may continue working in the browser 130 in the usual way.

Figure 4:
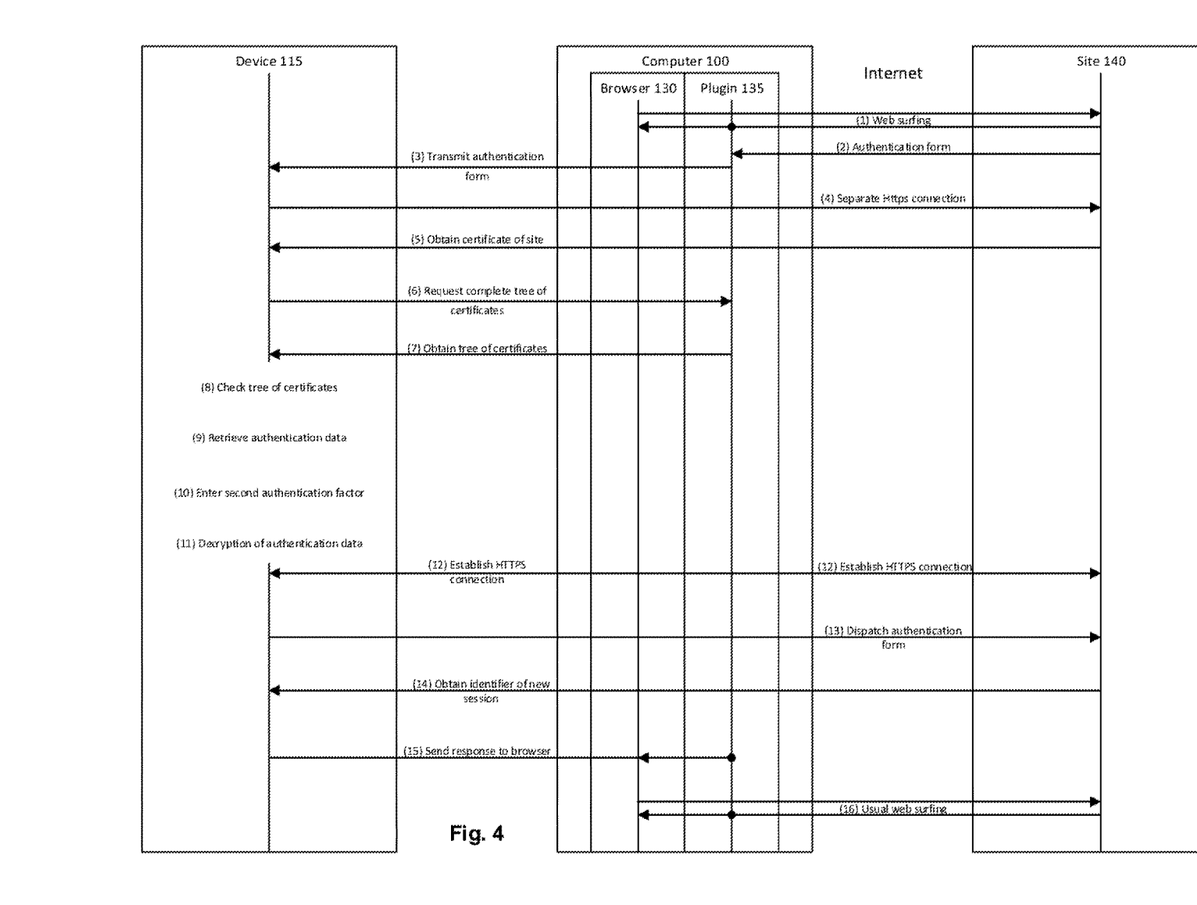
FIG. 4 shows an expanded diagram of exemplary method of secure online authentication.

Referring to FIG. 4, during the ordinary web surfing of the user via the browser 130 (step 1), an authentication form may arrive from the site 140 (step 2), which may be intercepted by the plugin 135 and sent to the device 115 (step 3). The device 115 may use the plugin 135 to establish an additional, direct https connection with the site 140 (step 4) and receive the certificate of this site (step 5). To check the validity of the certificate, the device 115 may request a complete tree of certificates from the plugin 135 from the user's computer (step 6). Using the list of its own root certificates (stored on the device 115), a check may be performed on the device 115 of the validity of the received (step 7) certificate (step 8), and authentication data may be retrieved on the device 115 for the given computer (step 9), corresponding to the site 140. A request may be then sent to the user to obtain the second authentication factor (for example, a fingerprint or password entered directly into the device 115) (step 10) and the authentication data in the memory of the device 115 may be decrypted (step 11). After successful performance of the preceding steps, the device 115 (with the help of the plugin 135, which may only establish a TCP connection and transmit data to the device 115) may complete the establishing of the https connection with the site 140 (step 12) and send to the site 140 the filled-out authentication form (step 13). For the server (site 140), this may look like the obtaining of a filled-out form from the browser 130. The response obtained from the server (step 14) may be relayed by the device 115 to the plugin 135, which may transmit this directly to the browser 130 (step 15), so that the browser 130 at once may obtain a new session (step 16), having completely passed the authentication mechanism.

In another exemplary aspect, a secure channel for transmission of data between the device 115 and the site 140 may be established. As discussed above, the computer system 100 may be infected with a malicious application 120, which has not been detected by the antivirus application 110. Given that the device 115 may not have access to the resources of the computer system 100 and may not perform a supplemental scanning of that system, the device 115 may also request the following data from the antivirus application 110 periodically or at the time of a request from the antivirus application 110 to send data to the site 140:

the time and status of the last antivirus scan;
the update status of the antivirus databases;
the type of connection to the Internet;

information on the last known computer threats, which is provided by all suppliers of antivirus software (AV), for example Kaspersky Laboratory provides this in the context of participation in the KSN (Kaspersky Security Network).

After obtaining the given information, a verification of this information may occur on the device 115 with the help of a series of rules which may determine the choice of the settings of the secure data transmission channel between the device 115 and the site 140.

EXAMPLE 1

Time and status of the last antivirus scan: one minute ago, no harmful software was found.

Antivirus database update status: latest version of antivirus databases has been downloaded.

Type of connection to the Internet: VPN (Virtual Private Network).

Information on the last known computer threats: not found.

Decision: data can be provided through the plugin 135 in decrypted form.

EXAMPLE 2

Time and status of the last antivirus scan: one minute ago, no harmful software was found.

Antivirus database update status: latest version of antivirus databases has been downloaded.

Type of connection to the Internet: open access.

Information on the last known computer threats: new family of malicious software Zeus detected.

Decision: data can be provided through the plugin 135 in encrypted form.

EXAMPLE 3

Time and status of the last antivirus scan: one week ago, harmful software was found.

Antivirus database update status: antivirus databases updated more than a week ago.

Type of connection to the Internet: open access.

Information on the last known computer threats: no data found.

Decision: data should be provided through separate protected connection in encrypted form.

The antivirus application 110 may apply such decisions on the computer system 100. In some aspects, the creation and use of a VPN connection may be provided. In addition, supplemental protection may be provided for the address space of the processes of the browser 130 and plugin 135 against possible scans on the part of the malicious application 120, and also protection of the clipboard and the inter-process communication (IPC) channels.

Figure 5:
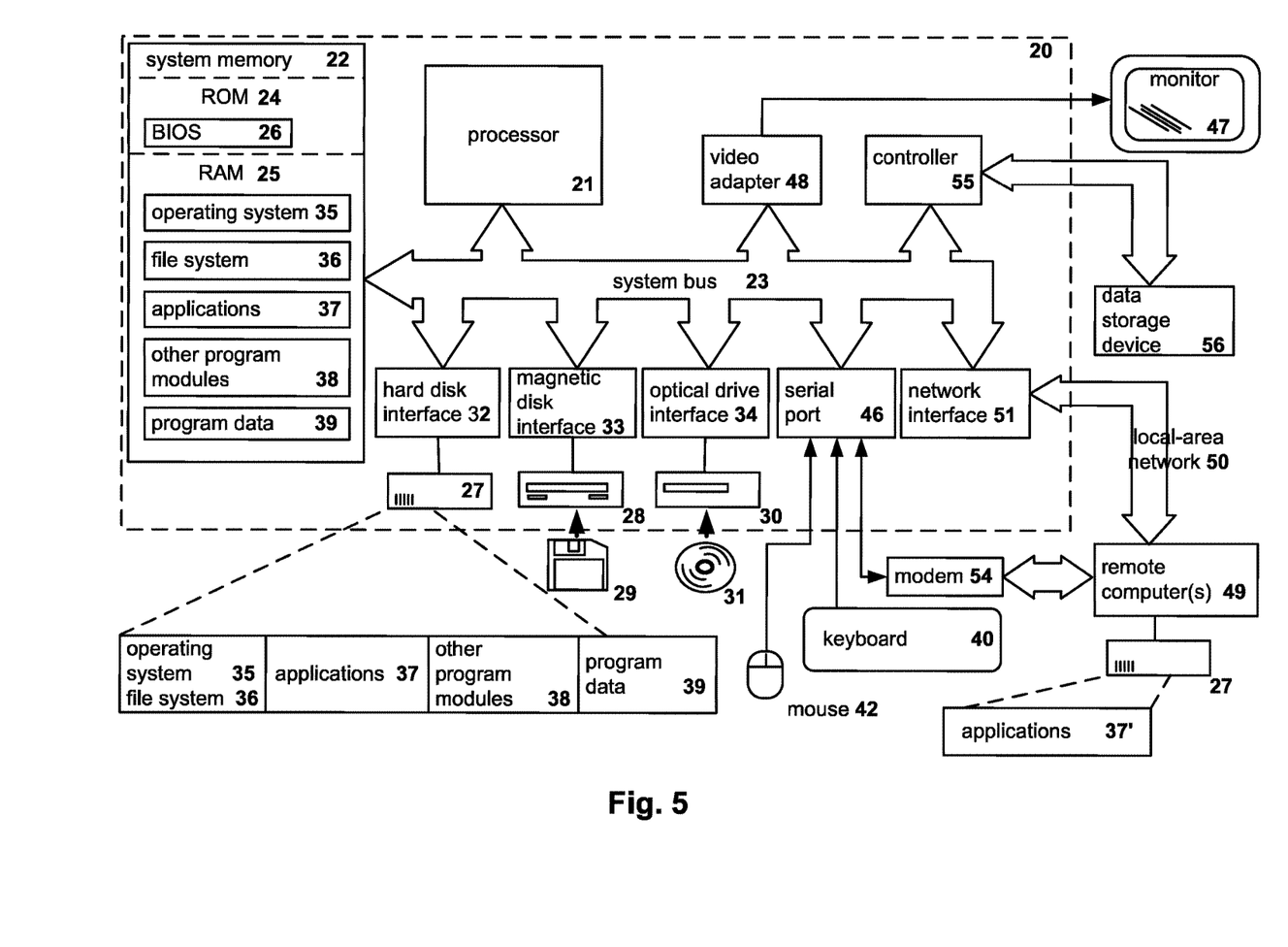
FIG. 5 shows an example configuration of a general-purpose computer system on which aspects of the disclosed systems and method may be implemented.

FIG. 5 illustrates an example computer system (which may be a personal computer or a server) on which the disclosed systems (including one or more of the modules) and the method can be implemented according to an example aspect. As shown, the computer system 20 may include a central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is stored and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, using a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate within a network environment, using a network connection to one or more remote computers 49. The remote computer (or computers) 49 are also personal computers or servers having the majority or all of the aforementioned elements in describing the nature of a personal computer 20, as shown in FIG. 5. Other devices can also be present in the computer network, such as routers, network stations, peer devices or other network nodes.

Network connections can form a local-area computer network (LAN) 50, such as a wired and/or wireless network, and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as Bluetooth.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

As noted above, in various aspects, the systems and methods described in the present disclosure in terms of modules. It is reiterates that the term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 5 above). Accordingly, each module can be realized in a variety of suitable configurations, and should not be limited to any example implementation exemplified herein.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A computer-implemented method for secure online authentication, the method comprising:
   determining, via a processor of a secure connection device, a connection being established between a browser application installed on a computer system and a protected website, wherein the computer system is distinct from the device;
   obtaining, at the device, information relating to the protected website in response to a plugin of the browser application determining that the computer system has obtained a request for authentication from the protected website;
   establishing a protected data transmission channel between the device and the protected website to receive, at the device, at least one certificate of the protected website;
   receiving a complete tree of certificates, except a root certificate, associated with the protected website from the plugin of the browser application;
   verifying validity of the complete tree of certificates based on a list of root certificates stored on the device;
   when the validity of the complete tree of certificates is not verified, disconnecting the protected data transmission channel;
   responsive to the complete tree being verified, performing authentication and transmitting, from the device, authentication data stored on the device to the protected website; and
   in response to an indication of a successful authentication from the protected website, transmitting a new session identifier from the device to the plugin of the browser application for enabling access to the protected website.

2. The computer-implemented method of claim 1, wherein determining the connection being established between the browser application installed on the computer system and the protected website comprises: obtaining a uniform resource identifier (URI) address of the protected website via an application programming interface (API) provided by the browser application.

3. The computer-implemented method of claim 1, wherein determining the connection being established between the browser application installed on the computer system and the protected website comprises:
   intercepting network traffic between the browser application and the protected website via a driver installed on the device to obtain a uniform resource identifier (URI) address of the protected website.

4. The computer-implemented method of claim 1, further comprising confirming the protected website against a list of addresses of protected websites accessed by the computer system.

5. The computer-implemented method of claim 4, further comprising storing, on the device, the list of addresses of protected websites accessed by the computer system and encrypted data relating to the protected websites.

6. The computer-implemented method of claim 1, wherein the information relating to the protected website comprise: a URL address, information relating to the at least one certificate of the protected website, WHOIS information about a domain of the protected website, a list of headers obtained from a reply to a request at the URL address, information relating to downloaded scripts in the form of convolutions or hash sums.

7. The computer-implemented method of claim 1, further comprising:
   checking a validity of the protected website based on obtained information relating to the protected website, the information comprising obtained headers or list of downloaded scripts when establishing the connection.

8. The computer-implemented method of claim 1, further comprising:
   obtaining a second authentication factor for performing the authentication and transmitting the authentication data to the protected website.

9. The method of claim 8, further comprising:
   storing personal data associated with a user of the computer system on the device; and
   establishing the protected data transmission channel upon receiving login form information from the plugin.

10. The method of claim 9, further comprising:
    encrypting and storing payment data on the user accounts and transactions on the device.

11. The method of claim 10, further comprising:
    responsive to obtaining the second factor authentication, decrypting the payment data; and
    transmitting the payment data to the protected website.

12. The computer-implemented method of claim 1, further comprising:
    continuing access to the protected website using browser application after transmitting identification information to the browser application for enabling access to the protected website.

13. The method of claim 1, further comprising:
    requesting, by the device, information related to a last virus protection activity of the computer system;
    verifying the information received based on a series of rules; and
    determining settings of the protected data transmission channel based on the verification.

14. A system for secure online authentication, comprising:
    at least one processor of a secure data transmission device configured to:
    determine a connection being established between a browser application installed on a computer system and a protected website, wherein the computer system is distinct from the device;
    obtain information relating to the protected website in response to a plugin of the browser application determining that the computer system has obtained a request for authentication from the protected website;
    establish a protected data transmission channel between the device and the protected website to receive at least one certificate of the protected website;
    receiving a complete tree of certificates, except a root certificate, associated with the protected website from the plugin of the browser application;
    verify validity of the complete tree of certificates based on a list of root certificates stored on the device;
    when the validity of the complete tree of certificates is not verified, disconnect the protected data transmission channel;
    responsive to the complete tree being verified, perform authentication, from the device, and transmit authentication data to the protected website; and
    in response to an indication of a successful authentication from the protected website, transmit a new session identifier from the device to the plugin of the browser application for enabling access to the protected website.

15. The system of claim 14, wherein, to determine the connection being established between the browser application installed on the computer system and the protected website, the processor is configured to:

obtain a uniform resource identifier (URI) address of the protected website via an application programming interface (API) provided by the browser application; or intercept network traffic between the browser application and the protected website via a driver installed on the device to obtain a uniform resource identifier (URI) address of the protected website.

16. The system of claim 14, wherein the processor is further configured to:

store a list of addresses of protected websites accessed by the computer system and encrypted data relating to the protected websites; and confirm the protected website against the list of addresses of protected websites accessed by the computer system.

17. The system of claim 14, wherein the information relating to the protected website comprise:

a URL address, information relating to the at least one certificate of the protected website, WHOIS information about a domain of the protected website, a list of headers obtained from a reply to a request at the URL address, information relating to downloaded scripts in the form of convolutions or hash sums.

18. The system of claim 14, wherein the processor is further configured to check a validity of the protected website based on obtained information relating to the protected website, the information comprising obtained headers or list of downloaded scripts when establishing the connection.

19. The system of claim 14, wherein the processor is further configured to:

continue access to the protected website using browser application after transmitting identification information to the browser application for enabling access to the protected website.

20. A non-transitory computer readable medium storing thereon computer executable instructions for secure online authentication, including instructions for:

determining a connection being established between a browser application installed on a computer system and a protected website;

obtaining information relating to the protected website in response to a plugin of the browser application determining that the computer system has obtained a request for authentication from the protected website;

establishing a protected data transmission channel between a secure data transmission device and the protected website to receive, at the device, at least one certificate of the protected website, wherein the computer system is distinct from the device;

receiving a complete tree of certificates, except a root certificate, associated with the protected website from the plugin of the browser application;

verifying validity of the complete tree of certificates based on a list of root certificates stored on the device;

when the validity of the complete tree of certificates is not verified, disconnecting the protected data transmission channel;

responsive to the complete tree being verified, performing authentication and transmit, from the device, authentication data to the protected website; and in response to an indication of a successful authentication from the protected website, transmitting a new session identifier from the device to the plugin of the browser application for enabling access to the protected website.

* * * * *